United States Patent [19]
Huigens

[11] 3,730,296
[45] May 1, 1973

[54] INTERLOCK SAFETY DEVICE FOR MACHINERY

[75] Inventor: Wilfred J. Huigens, Clarinda, Iowa

[73] Assignee: Lisle Corporation, Clarinda, Iowa

[22] Filed: Feb. 23, 1972

[21] Appl. No.: 228,692

[52] U.S. Cl. ................192/134, 100/53, 340/252 R, 340/267 R
[51] Int. Cl. ............................F16p 3/08, G08b 21/00
[58] Field of Search ....................192/131 R, 134; 100/53; 200/167 A; 340/252 R, 267 R

[56] References Cited

UNITED STATES PATENTS

| | | | |
|---|---|---|---|
| 3,103,270 | 9/1963 | Tilbury | 192/134 X |
| 3,147,466 | 9/1964 | Stacy | 340/252 R |
| 3,276,557 | 10/1966 | Brown | 192/134 |
| 3,300,009 | 1/1967 | Hess | 192/134 X |
| 3,389,628 | 6/1968 | Banks et al. | 192/134 X |
| 3,487,182 | 12/1969 | Grundy | 192/134 X |
| 3,662,369 | 5/1972 | Vinsani et al. | 200/167 A X |
| 3,343,158 | 9/1967 | Tellerman | 340/267 R X |

Primary Examiner—Allan D. Herrmann
Attorney—A. W. Molinare et al.

[57] ABSTRACT

A control box interposed between the power source for a machine and a machine prevents the delivery of power to the machine until all machinery guards associated with the machine are in a closed circuit position. The control box includes a series of standard sockets, one socket associated with each machinery guard. The control device operates to open a circuit breaker in the power supply line whenever the machinery guards are open or opened.

2 Claims, 2 Drawing Figures

Patented May 1, 1973 3,730,296

INTERLOCK SAFETY DEVICE FOR MACHINERY

BACKGROUND OF THE INVENTION

In a principal aspect, the present apparatus is a safety control device especially useful in combination with manufacturing machinery such as presses.

On Apr. 27, 1971, the United States Department of Labor issued a set of Occupational Safety and Health Standards pursuant to Section 6(a) of the Williams Steiger Occupational Safety and Health Act of 1970 (84 stat. 1593). These standards comprise Part 1910 of Chapter 17 of Title 29 of the Code of Federal Regulations. These rules and regulations establish and codify national concensus standards and federal standards for the safety of materials, machinery and processes utilized by American industry.

Subpart O of these rules and regulations is particularly pertinent to the present application. In subpart O, numerous standards, rules and regulations are set forth regarding the requirement for guards on power machinery such as presses. The number and placement of such guards, which are known to those skilled in the art of machinery, is standardized by these rules.

Needless to say, the utilization of guards has in the past been somewhat lax since there were no specific standards and requirements for the use of such guards. Nonetheless, many manufacturers use such guards if for no other reason than to protect their employees and lower their insurance rates.

With the promulgation of these new standards it now becomes necessary for almost every machining operation to require a particular guard setup. Of course, this may seem most bothersome for short runs on a machine since an electrician must necessarily come in, arrange the guards as required on the machine and wire the guards in an appropriate control circuit for the machine.

An electrician is required since generally a guard is a door or some other type of closure which fits over a moving piece of machinery. An electrical circuit is completed only if the guard is in its closed position. Only if the electric circuit is completed can the machinery be made to operate. Otherwise, power will not be supplied to the machinery. Typical prior art references which disclose this general concept include Banks et al. U.S. Pat. No. 3,389,628; Tilbury U.S. Pat. No. 3,103,270; Hess U.S. Pat. No. 3,300,009; Brown U.S. Pat. No. 3,276,557; Adams et al. U.S. Pat. No. 3,181,035; and Holland U.S. Pat. No. 3,311,794.

A feature which is common to all of the above-identified patents is that each guard system is unique to the specific machine and operation of that machine. Thus, it becomes desirable to provide an apparatus wherein the guards may be changed easily without unnecessary delay and extensive rewiring.

SUMMARY OF THE INVENTION

In a principal aspect, the present invention comprises a control box which is associated with a machine as a part of the control circuitry for the machine. The control box may be utilized with any machine and with any number and type of guards that can be used on the machine. Thus, for example, a machine which performs a particular stamping operation will require a particular type and arrangement of guards. By use of the present invention, the guards may be easily attached to the machine and plugs which connect with the electrical leads associated with the guards may be plugged in appropriate sockets in the control box mechanism of the present invention.

It is thus an object of the present invention to provide an improved control box mechanism which may be utilized in combination with guards and machinery on which the guards are to be used.

It is a further object of the present invention to provide a standard and modular system for utilizing guards with any machinery and with any guards used in association with that machinery.

Still another object of the present invention is to provide a system for attaching and utilizing guards in association with machinery in accordance with Federal Occupational Safety and Health Standards which system is simple, economic and easy to incorporate with existing machinery.

These and other objects, advantages and features of the present invention will be set forth in greater detail in the description which follows.

BRIEF DESCRIPTION OF THE DRAWING

In the detailed description which follows, reference will be made to the drawing comprised of the following FIGURES.

DESCRIPTION OF THE PREFERRED EMBODIMENT

Figure 1:
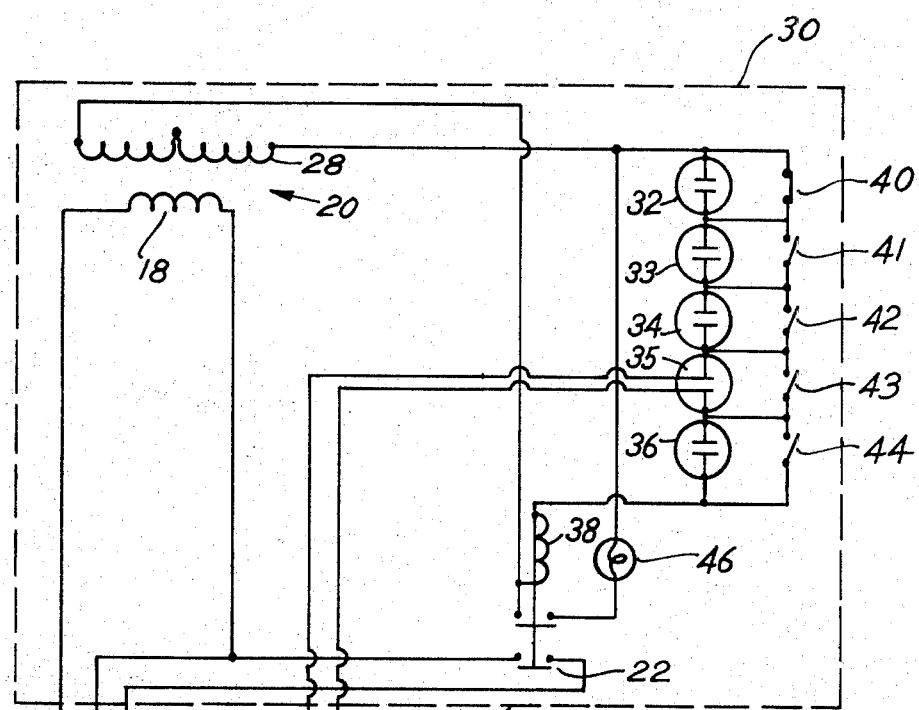
FIG. 1 is an electrical schematic of the control mechanism or control box of the present invention as utilized in association with a piece of power equipment and guards associated with that equipment.
Figure 2:
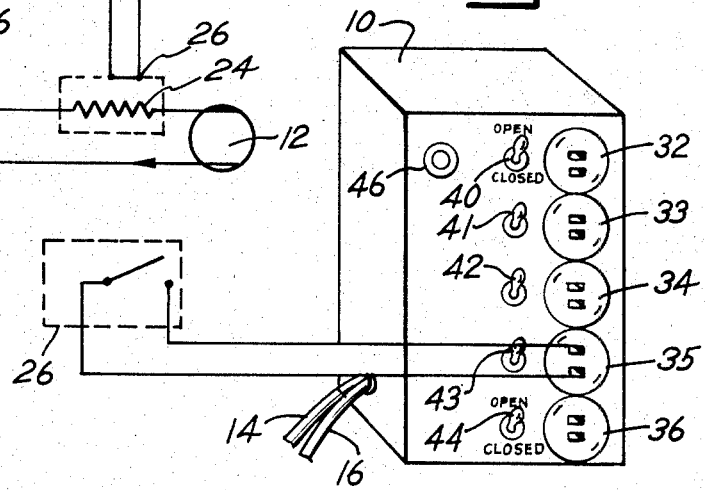
FIG. 2 is a perspective view of the improved control box of the present invention in combination with a schematic guard.

Referring to the FIGS. 1 and 2, the safety control mechanism of the present invention is housed in an enclosure or housing 10 illustrated schematically in FIG. 1 by the dashed line. Alternating current from a source 12 flows through lead wires 14 and 16 into the housing 10. Of course, the wires 14 and 16 are insulated from the housing 10. The voltage supplied through the wires 14 and 16 is a generally high voltage, for example, 120 volts a.c. or more. Within the housing 10, the "hot" lead wire 14 is spliced and connected with a primary coil 18 of a transformer 20. The opposite side of the coil 18 is grounded.

Transformer 20 is a step-down transformer wherein the primary coil 18 is generally in parallel with a normally open circuit breaker switch 22 within the enclosure 10 and a machine schematically illustrated by the resistor 24. That is, the resistor 24 represents the load on the power line resulting from operation of a machine, for example, a stamping press or the like.

Typically, the machine would include a number of moving parts which as stated above under new federal regulations require certain guards. A guard 26 is schematically illustrated in FIG. 1 in a closed guard position. In FIG. 2, guard 26 is illustrated in the open circuit position, that is, before the guard 26 is properly placed on a machine or properly closed over the moving part on that machine. The use of guards and their placement on machines is well known to those skilled in the art.

The transformer 20 also includes a secondary coil 28 which is one of a number of electric elements in series in a control circuit 30 illustrated generally by the dotted line in FIG. 1. The transformer 20 steps down voltage to a small control circuit amount, say 12 volts, to further accentuate the safety features of the apparatus. Also included as part of the control circuit 30 are a plurality of sockets 32–36 which are connected in series with coil 28 and with a solenoid coil 38 associated with the normally open circuit breaker 22. A plurality of shunt switches 40–44 are associated with each of the sockets 32–36 respectively. Closing one of the shunts as at 40 permits short circuiting the control effect attributable to the associated socket 32.

Lead wires from an appropriate mating plug associated with a guard, as at 26, connect with the leads of a socket as for example socket 35 in FIG. 1. Thus, a circuit may be completed through the coil 28, appropriate shunts 40–44 and appropriate sockets 32–36 and guards 26 to energize the coil 38 and thus close the normally open circuit breaker 22. This permits a flow of power to the machine 24.

A telltale light 46 is arranged in parallel with the sockets 32–36 and their associated shunts 40–44 respectively. Operation of the light 46 is also responsive to the movable element of the breaker 22 so that current flow through coil 38 will cause the light 46 to be activated. Thus, if there is a failure in the system, one can tell at a glance whther the failure is in the control mechanism illustrated schematically in FIG. 1. If the light is not lit, then power is not being supplied to the machine 24. On the other hand, if the light is lit, and the machine does not operate, then the machine is faulty.

The apparatus has many advantages and modifications. For example, the sockets as at 32 may have geometrical openings which are unique and can receive only plugs associated with desired guards.

Also, after a short press run, it is possible to manipulate and alter the position of guards for a new press run without requiring an electrician to rewire the system.

A preferred embodiment of the present invention is described in this specification. Nevertheless, it is to be understood that the invention shall be limited only by the following claims and their equivalents.

What is claimed is:

1. An interlock safety device to be utilized in combination with machinery guards and a machine upon which said guards are mounted comprising, in combination:

an enclosure;

an alternating current electrical power supply line into said enclosure, said power line being the power line for said machine;

a normally open circuit breaker in said power supply line and mounted in said enclosure, said circuit breaker being in series with said machine whenever said device is used in combination with said machine;

a low voltage control circuit mounted in said enclosure;

a step-down transformer mounted in said enclosure and having a primary in parallel with said normally open circuit breaker and having a secondary in series in said low voltage control circuit, said low voltage control circuit including in series said secondary coil, a plurality of sockets for machinery guards, a shunt for each of said sockets, and a solenoid coil for said normally opened power supply circuit breaker, said power supply circuit breaker being closed whenever power is on to said supply line and said socket is shunted or has closed machinery guards plugged therein.

2. The device of claim 1 including a telltale light in parallel with said plurality of sockets.

* * * * *